Jan. 11, 1927.

F. HODGKINSON 1,613,753

HYDRAULIC REGULATING DEVICE

Filed Dec. 27, 1924    2 Sheets-Sheet 1

WITNESSES:

F. Hodgkinson
INVENTOR

BY

ATTORNEY

Patented Jan. 11, 1927.

1,613,753

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

HYDRAULIC REGULATING DEVICE.

Application filed December 27, 1924. Serial No. 758,404.

My invention relates to regulating apparatus of the hydraulic type, particularly that embodying an intermittently operated servo-motor, and a forced feed lubricating system, and has for an object the provision of apparatus of the character designated, which shall insure, at all times, a sufficient volume of fluid for operation of the servo-motor and an adequate supply of lubricant to the lubricating system.

Figure 1:
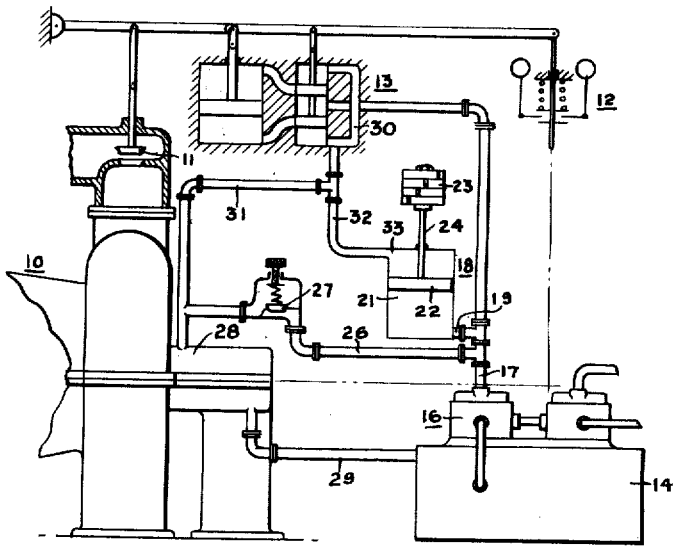
Figure 2:
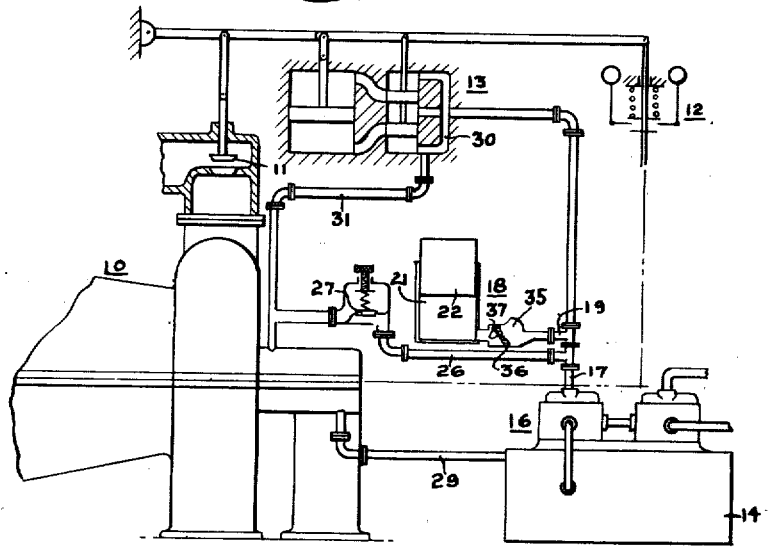
Figure 3:
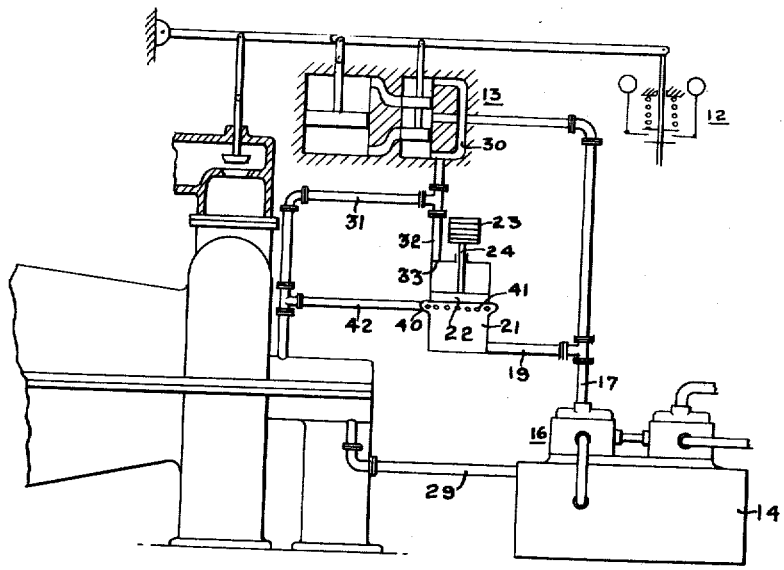

Apparatus made in accordance with my invention is illustrated in the accompanying drawings in which Fig. 1 is a view, partly diagrammatic, showing one form of my invention, and Figs. 2 and 3 show modifications thereof.

Regulating apparatus of the hydraulic type such, for example, as that employed with steam turbines, usually embodies a pump for supplying a quantity of lubricating fluid, a weighted valve located in the system for imposing a pressure upon the fluid, a speed-responsive device for controlling the turbine valves through a hydraulic relay or servo-motor, said servo-motor being actuated by the lubricating fluid under pressure, and a forced feed lubricating system, also supplied by the pump.

Under operating conditions, with varying or constant load or speed, the quantity of fluid required for the lubricating system does not change. The quantity of fluid supplied by the pump is generally more than enough to supply the needs of the lubricating system and the needs of the servo-motor so long as the load remains constant or the variations of the load are not violent. When, however, the prime mover is subjected to violently fluctuating loads the quantity of fluid supplied, which is proportioned to the needs of the lubricating system, is frequently insufficient to permit the servo-motor to operate at the speed necessary to follow the speed-responsive mechanism.

In such a system, it will be obvious that, upon frequent changes in load and speed, or upon comparatively wide ranges of movement of the servo-motor, the volume of fluid required by the servo-motor might be such as to reduce the fluid pressure in the system below the operative pressure of the weighted valve. Under such circumstances the quantity and pressure of fluid required for quick operation of the servo-motor may be lacking.

In order to provide for this abnormal demand for fluid under pressure, I provide, in accordance with my invention, an accumulator or storage reservoir for the fluid having a pressure imposed thereon. After the accumulator is filled, the servo-motor being inactive, all fluid delivered by the pump escapes through the weighted valve and flows to the lubricating system. A weighted valve is employed between the pump and the lubricating system, the high pressure side of which communicates with the accumulator and the servo-motor. The low pressure side of the valve communicates with the lubricating system, which requires fluid at a relatively low pressure.

In accordance with my invention, I further provide means whereby the excess fluid taken from the accumulator and exhausted by the servo-motor when in operation, may pass to the space above the weighted piston. When the fluid under pressure within the accumulator is depleted to any extent and the fluid under pressure delivered by the pump starts flowing into the accumulator, moving the weighted piston, the fluid on the other side thereof is forced into the lubricating system.

Referring now to the drawings for a better understanding of my invention, I show in Fig. 1, at 10, a steam turbine having an admission valve 11, said admission valve being controlled by a speed-responsive device at 12, through a servo-motor 13, all as is well known in the art. Fluid under pressure for operation of the servo-motor 13 is pumped from a reservoir 14 by a pump 16 and is delivered to the servo-motor through a conduit 17 leading from the pump thereto. In order to provide sufficient volume of fluid under pressure to meet abnormal demands therefor on the part of the servo-motor, an accumulator 18 is provided which is filled with fluid under pressure through a branch 19 of the conduit 17. The accumulator 18 embodies a cylinder 21 having a piston 22 disposed therein, said piston being subjected on one side to the fluid pressure developed by the pump 16, through the conduits 17 and 19, and on the other side to the force exerted by a weight 23, connected thereto by a piston rod 24.

In order to supply fluid to the lubricating system, a by-pass 26 is disposed between said lubricating system and the delivery conduit 17 of the pump 16. For maintaining the pressure of the fluid delivered by the pump to that desired for operation of the servo-motor 13 a weighted valve 27 is disposed within the conduit 26, said valve being set to operate at a relatively higher pressure than that imposed upon the fluid within the accumulator 18 by the weight 23. The fluid for the lubricating system passes by the valve 27 at a reduced pressure, for example, to the bearing cap 28, and after being employed for lubricating the bearings, drains back to the reservoir 14 through a conduit 29.

Upon operation of the servo-motor 13, fluid is exhausted therefrom through an exhaust passage 30 and a conduit 31 connected to the low pressure side of the by-pass 26 leading to the bearing cap 28. A branch conduit 32 leads from the conduit 31 to a port 33 in the upper end of the cylinder 21 of the accumulator 18. The function of this branch conduit is to permit fluid exhausted from the servo-motor 13, which is not immediately required by the lubricating system, to pass to the space above the piston 22 within the cylinder 21.

The operation of the apparatus so far described is apparent. Fluid under pressure is developed by the pump 16, supplying the servo-motor 13 with motive fluid and supplying the lubricating system. When the turbine is running under uniform load conditions and constant speed, the servo-motor is inactive and does not employ any fluid under pressure. At such times, the accumulator 18, is not already full, is being charged through the branch conduit 19 as shown in Fig. 1. Upon a sudden change of load, necessitating a wide range of movement of the servo-motor 13 to operate the valve, a considerable volume of fluid under pressure is required. At such times, fluid is exhausted from the servo-motor 13 into the conduit 31. At the same time the volume of fluid under pressure required to operate the servo-motor 13 is supplied from the accumulator, the piston 22 moving in a downward direction, forcing the fluid out through the conduit 19 into the conduit 17. Inasmuch as the volume of fluid required in the lubricating system is fairly constant, all of the fluid exhausted from the servo-motor 13 is not required in the lubricating system and a part passes to the space above the piston 22 within the cylinder 21 in a manner already described. The operation of the sermo-motor suddenly reduces the pressure within the conduit 17 to that imposed upon the fluid within the cylinder 21 of the accumulator 18, by the weight 23. Inasmuch as this pressure is less than the operating pressure of the weighted valve 27, fluid now ceases to flow through the by-pass 26 to the lubricating system. In this situation, while the piston 22 is moving downwardly, fluid is supplied to the lubricating system from the exhaust of the servo-motor 13, the excess fluid passing through the branch conduit 32 to the accumulator 18 as already described. It is clear that whatever motion there may be of the servo-motor 13 and whether the amount of fluid in the accumulator 18 is depleted or not, the flow of fluid to the lubricating system is constant and is, except for various leakages, the quantity delivered by the pump 16.

As soon as the speed of the turbine again becomes constant, the servo-motor becomes inactive and fluid under pressure, developed by the pump 16, again flows through the branch conduit 19 into the accumulator 18 forcing the piston 22 upwardly. As long as the accumulator 18 is being filled, the pressure within the conduit 17 remains at that imposed by the weight 23 upon the piston 22, and the weighted valve 27 is inoperative. As the accumulator 18 is being refilled, however, the piston 22 is forced upwardly and the fluid above the piston is forced out through the port 33 and branch conduit 32 into the conduit 31 and thence to the lubricating system.

In the modification of my invention shown in Fig. 2, the same numerals used in Fig. 1 indicate like parts. In this modification, however, instead of providing the branch conduit 32 as shown in Fig. 1, to insure a flow of fluid through the lubricating system when the accumulator 18 is being refilled, I provide a check valve 35 within the branch conduit 19 leading to the accumulator 18. The check valve 35 is provided with a swing disc member 36 having a restricted orifice 37 therein. The swing disc member 36 is so arranged that when a comparatively large volume of fluid is required by the servo-motor 13, it opens wide, permitting fluid under pressure to flow freely from the accumulator 18 into the conduit 17 and thence to the servo-motor. After the volume of fluid within the accumulator 18 has been reduced and fluid under pressure developed by the pump 16 again begins to flow from the conduit 17 thereto, the swing disc member 36 closes and the fluid under pressure is forced to pass through the restricted orifice 37 into the cylinder 21 of the accumulator. The restricted orifice 37 is of such an area as not to cause an appreciable drop in pressure in the conduit 26 when the accumulator is being refilled. In this modification, therefore, at times when the servo-motor 13 is operating, fluid exhausted therefrom passes through the conduit 31 to the lubricating system. When the servo-motor 13 again becomes inactive and the accumulator 18 is being refilled, inasmuch as the flow of fluid through the orifice 37 is restricted with the disc member 36 seated, the weighted valve 27 is then operative, and fluid under pressure passes therethrough to the lubricating system, only diminished in quantity from that delivered by the pump 16, by the small amount flowing through the orifice 37.

In Fig. 3 I show a still further modification of my invention, in which the weighted piston 22 of the accumulator serves as a weighted valve for maintaining the pressure required for operating the servo-motor 13 constant and for by-passing the required fluid to the lubricating system. In this modification I provide the central portion of the cylinder 21 with a series of ports 41 leading to an annular passage 40. Between this annular passage and the conduit 31 leading to the lubricating system, is a conduit 42, through which fluid for the lubricating system flows after the accumulator piston has been raised above the ports 41. Fluid exhausted from the servo-motor when in operation in excess of that required for the bearings, is conveyed to the upper end of the cylinder 21 through a conduit 32 the same as is shown in Fig. 1.

The operation of apparatus made in accordance with this modification of my invention is obvious. Fluid under pressure developed by the pump 16 passes through the conduit 17, to the servo-motor and, through the branch conduit 19, into the accumulator cylinder 21 forcing the piston 22 upwardly until the ports 41 are uncovered. The piston 22 then serves as a weighted valve member and the fluid flows thereby at a reduced pressure through the conduit 42 to the conduit 31 and thence to the bearings, draining back through the conduit 29 to the reservoir 14.

Upon abnormal demands for fluid by the servo-motor 13, fluid under pressure imposed by the weighted piston 22, within the cylinder 21, flows from the accumulator 18 to the servo-motor 13. Fluid exhausted from the servo-motor 13, in excess of that immediately required by the lubricating system, passes through the upper end of the cylinder 21 through the conduit 32. When the accumulator 18 is being refilled and the piston 22 being forced upwardly, fluid above said piston is forced out through the ports 41 and conduits 32 and 42 to the conduit 31 and to the bearings 28, thus ensuring a full normal flow of fluid to the lubricating system upon depletion of fluid within the accumulator and during the refilling thereof.

From the foregoing it will be apparent that I have invented a hydraulic regulating apparatus embodying a fluid pressure operated servo-motor and a forced feed lubricating system in which there is provided, at all times, a sufficient volume of fluid under pressure to insure quick operation of the servo-motor, and to constantly supply fluid to the lubricating system.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In regulating apparatus of the hydraulic type, the combination with a servo-motor, a forced feed lubricating system, a pump for supplying fluid under pressure to the servo-motor and to the forced feed lubricating system, an accumulator for storing fluid under pressure to meet abnormal demands therefor by the servo-motor and means for conducting fluid from the pump to the accumulator and to the servo-motor, of means for conducting fluid from the pump to the lubricating system, a weighted valve member disposed within said last-mentioned means for maintaining a relatively high pressure of fluid delivered by the pump for operation of the servo-motor, said weighted valve member preventing a flow of fluid thereby when the accumulator is being filled, and means ensuring a flow of fluid to the lubricating system upon depletion of the fluid in the accumulator and during the refilling thereof.

2. In a regulating apparatus of the hydraulic type embodying a fluid-pressure operated servo-motor and a forced feed lubricating system, the combination with means for developing a relatively high fluid pressure for operating the servo-motor and for supplying fluid to the lubricating system, and an accumulator for maintaining a sufficient volume of fluid under pressure for abnormal demands of the servo-motor, of a conduit from the fluid-pressure developing means to the servo-motor and to the accumulator, means associated with said conduit for permitting a flow of fluid to the lubricating system, said means permitting a flow of fluid thereby only when the fluid pressure delivered by the pump exceeds that at which the accumulator is filled, and means insuring a flow of fluid to the lubricating system after depletion of the fluid within the accumulator and during the consequent refilling thereof.

3. In a regulating apparatus of the hydraulic type embodying a fluid-pressure operated servo-motor and a forced feed lubricating system, a fluid reservoir having a pump associated therewith for developing fluid under a relatively high pressure for operating the servo-motor and supplying fluid to the lubricating system, an accumulator for maintaining a sufficient volume of fluid under pressure for quick operation of the servo-motor during wide ranges of movement thereof, said accumulator comprising a cylinder having a weighted piston disposed therein, an inlet at one end of the cylinder for fluid under pressure opposing the force exerted by the weighted piston and a port at the opposite end in communication with a conduit leading to the lubricating system and with the exhaust of the servo-motor, a conduit from the pump for conveying fluid under pressure to the servo-motor and to the accumulator cylinder, and means associated with said conduit for permitting a flow of fluid to the lubricating system, said means being operable only at a pressure exceeding that imposed by the weighted piston of the accumulator cylinder upon the fluid contained therein.

4. In a regulating apparatus of the hydraulic type embodying a fluid pulp, a fluid pressure operated servo-motor, a forced feed lubricating system, and an accumulator cylinder for storing sufficient fluid under pressure for ready operation of the servo-motor, the combination of a fluid tight weighted piston in the accumulator cylinder, means for supplying fluid under pressure from the pump to the servo-motor and to the accumulator cylinder beneath the piston, and means for conveying the exhaust fluid from the servo-motor to the accumulator cylinder above the piston and to the lubricating system.

5. In a regulating apparatus of the hydraulic type embodying a fluid pressure operated servo-motor and a forced feed lubricating system, the combination with means for developing fluid pressure for operating the servo-motor and for supplying fluid to the lubricating system, of an accumulator cylinder for storing a sufficient volume of fluid under pressure for ready operation of the servo-motor, a conduit leading from the pump to the accumulator cylinder and to the servo-motor, means for supplying the full volume of fluid displaced by the pump to the lubricating system when the accumulator is full and the servo-motor is idle, said means preventing a direct flow of fluid from the pump to the lubricating system when the accumulator cylinder is being filled, a weighted piston in the accumulator cylinder and movable by fluid pressure when the accumulator is being filled, and a conduit from the exhaust of the servo-motor to the accumulator cylinder on the side of the piston remote from the fluid pressure and to the lubricating system.

6. In a regulating apparatus of the hydraulic type embodying a fluid pressure operated servo-motor and a forced feed lubricating system, the combination with a pump for developing fluid pressure for operating the servo-motor and for supplying fluid to the lubricating system, of an accumulator cylinder for storing a sufficient volume of fluid under pressure for ready operation of the servo-motor, a conduit leading from the pump to the accumulator cylinder and to the servo-motor, a piston in the cylinder and movable during filling of said accumulator, and means responsive to movement of the piston for effecting a flow of fluid to the lubricating system.

In testimony whereof, I have hereunto subscribed my name this ninth day of December, 1924.

FRANCIS HODGKINSON.

tor for maintaining a sufficient volume of fluid under pressure for quick operation of the servo-motor during wide ranges of movement thereof, said accumulator comprising a cylinder having a weighted piston disposed therein, an inlet at one end of the cylinder for fluid under pressure opposing the force exerted by the weighted piston and a port at the opposite end in communication with a conduit leading to the lubricating system and with the exhaust of the servo-motor, a conduit from the pump for conveying fluid under pressure to the servo-motor and to the accumulator cylinder, and means associated with said conduit for permitting a flow of fluid to the lubricating system, said means being operable only at a pressure exceeding that imposed by the weighted piston of the accumulator cylinder upon the fluid contained therein.

4. In a regulating apparatus of the hydraulic type embodying a fluid pulp, a fluid pressure operated servo-motor, a forced feed lubricating system, and an accumulator cylinder for storing sufficient fluid under pressure for ready operation of the servo-motor, the combination of a fluid tight weighted piston in the accumulator cylinder, means for supplying fluid under pressure from the pump to the servo-motor and to the accumulator cylinder beneath the piston, and means for conveying the exhaust fluid from the servo-motor to the accumulator cylinder above the piston and to the lubricating system.

5. In a regulating apparatus of the hydraulic type embodying a fluid pressure operated servo-motor and a forced feed lubricating system, the combination with means for developing fluid pressure for operating the servo-motor and for supplying fluid to the lubricating system, of an accumulator cylinder for storing a sufficient volume of fluid under pressure for ready operation of the servo-motor, a conduit leading from the pump to the accumulator cylinder and to the servo-motor, means for supplying the full volume of fluid displaced by the pump to the lubricating system when the accumulator is full and the servo-motor is idle, said means preventing a direct flow of fluid from the pump to the lubricating system when the accumulator cylinder is being filled, a weighted piston in the accumulator cylinder and movable by fluid pressure when the accumulator is being filled, and a conduit from the exhaust of the servo-motor to the accumulator cylinder on the side of the piston remote from the fluid pressure and to the lubricating system.

6. In a regulating apparatus of the hydraulic type embodying a fluid pressure operated servo-motor and a forced feed lubricating system, the combination with a pump for developing fluid pressure for operating the servo-motor and for supplying fluid to the lubricating system, of an accumulator cylinder for storing a sufficient volume of fluid under pressure for ready operation of the servo-motor, a conduit leading from the pump to the accumulator cylinder and to the servo-motor, a piston in the cylinder and movable during filling of said accumulator, and means responsive to movement of the piston for effecting a flow of fluid to the lubricating system.

In testimony whereof, I have hereunto subscribed my name this ninth day of December, 1924.

FRANCIS HODGKINSON.

---

Certificate of Correction.

Patent No. 1,613,753. Granted January 11, 1927, to

FRANCIS HODGKINSON.

It is hereby certified that error appears in the printed specification of the above-numbered patent requiring correction as follows: Page 4, line 22, claim 4, for the word " pulp " read *pump;* and that the said Letters Patent should be read with this correction therein that the same may conform to the record of the case in the Patent Office.

Signed and sealed this 19th day of April, A. D. 1927.

[SEAL.]
M. J. MOORE,
*Acting Commissioner of Patents.*

Certificate of Correction.

Patent No. 1,613,753.                          Granted January 11, 1927, to

FRANCIS HODGKINSON.

It is hereby certified that error appears in the printed specification of the above-numbered patent requiring correction as follows: Page 4, line 22, claim 4, for the word " pulp " read *pump;* and that the said Letters Patent should be read with this correction therein that the same may conform to the record of the case in the Patent Office.

Signed and sealed this 19th day of April, A. D. 1927.

[SEAL.]                                                M. J. MOORE,
*Acting Commissioner of Patents.*